Oct. 16, 1951     W. L. WAGNER     2,571,972
HOLDING RACK
Filed March 24, 1947
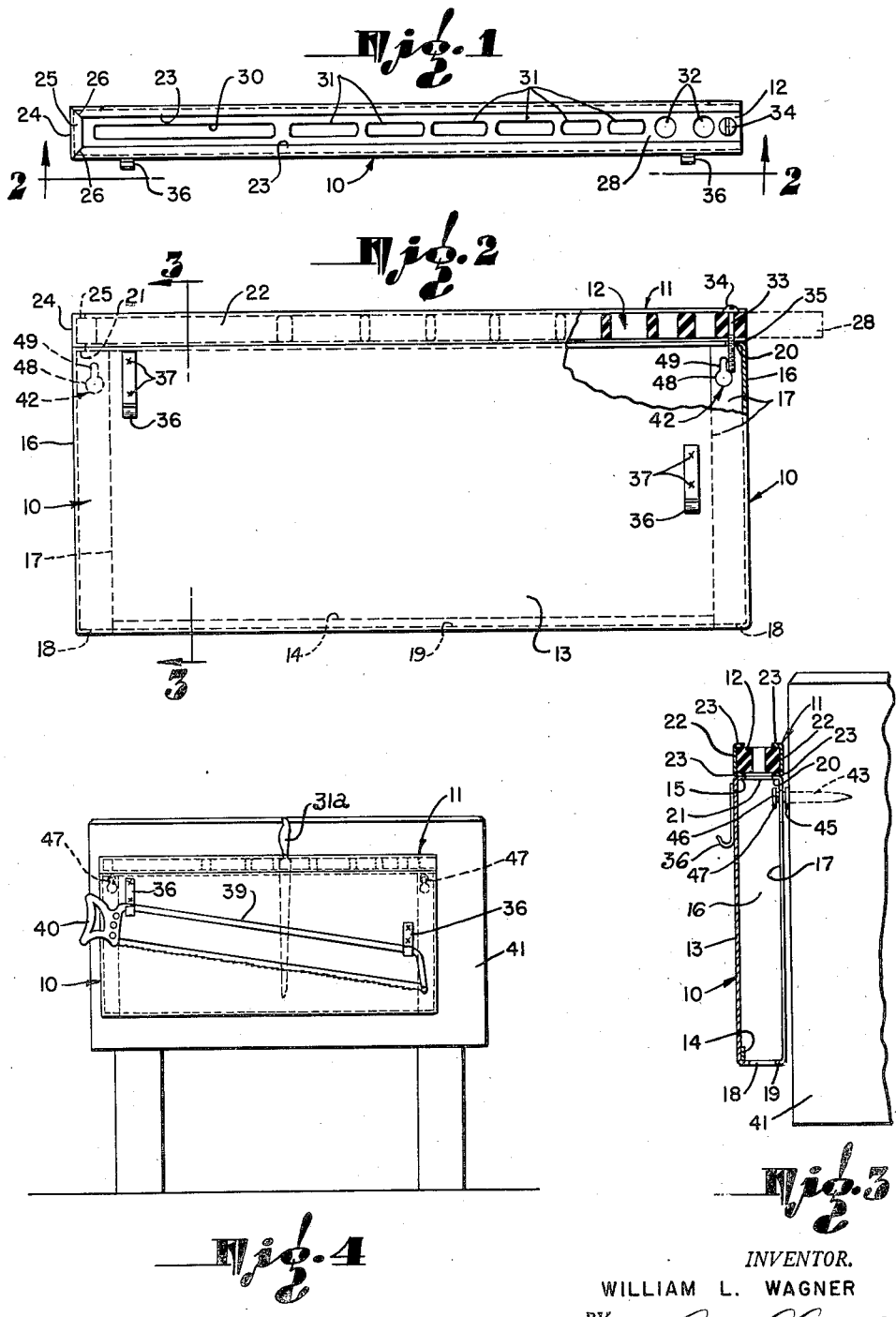
INVENTOR.
WILLIAM L. WAGNER
BY
ATTORNEY Patented Oct. 16, 1951

2,571,972

UNITED STATES PATENT OFFICE 2,571,972

HOLDING RACK

William L. Wagner, Los Angeles, Calif., assignor to A. H. McConnell, Pasadena, Calif.

Application March 24, 1947, Serial No. 736,654

6 Claims. (Cl. 211—60)

This invention relates generally to racks, and relates more particularly to racks for holding various implements and the like, used in meat markets or butcher shops.

Heretofore, it has been customary to provide meat cutting blocks with a rack for knives, cleaver, steel and the like, which is permanently attached at one side and which comprises a wooden slat-like member having wooden pieces for spacing the slat on the adjacent side of the block, said pieces being spaced apart longitudinally of the slat. The knives, cleaver, steel and the like, are slid into the places thus provided. Such racks have a number of disadvantages, one of which being that the arrangement is unsanitary in that it is permanently attached and is extremely difficult to clean.

It is therefore an object of the invention to provide a rack for various implements such as above mentioned, that is very easily cleaned and thus may be kept sanitary.

Another object of the invention is to provide a device of this character that may be readily attached to the block or other support, and that is readily removable therefrom.

Still another object of the invention is to provide a device of this character wherein there is a member having longitudinally spaced slots for reception of the blade portions or the like, of the respective implements, said member being readily removable for cleaning purposes.

Another disadvantage of prior racks is that the cutting edges of the knife blades tend to be dull when they are inserted or removed therefrom. As sharpening of the knives and other implements is expensive, it is desirable to prevent unnecessary dulling of said implements and it is therefore another object of the invention to provide a device of this character wherein the slotted implement supporting member is of rubber or a rubber-like material which will not materially dull the cutting edges of the knives when they are placed in the slots of said member or removed therefrom.

Still another disadvantage of prior racks is that the knife blades are exposed when supported by the rack and hence, there is danger of injury to persons who may brush against same.

A further object of the invention is to provide a rack wherein the knife blades are protected so that danger of injury to persons working around the block is eliminated.

In previous racks nails or brackets are provided for hanging a meat saw onto the block, and these saw supports are so placed that the saw is disposed over the implements in the rack and hence, add to the chance of the knife blades becoming dull inasmuch as said blades are apt to rub on the metal portions of the saw.

Further, prior racks are rather weak affairs and may be easily broken when such relatively heavy implements as cleavers are placed in them.

It is therefore a still further object of the invention to provide a rack that is relatively strong in construction and not easily broken.

Still another object of the invention is to provide a device of this character having means for supporting a saw thereon so that said saw is separated from contact with the knife blades and the like, by a wall.

Inasmuch as the prior racks are permanently attached to the meat cutting block, there is a distinct tendency for the user to work mostly on one side of the block so that said side becomes worn, and it is another object of the invention to provide a device of the present character which may be readily attached to different sides of the block so that the user may work on different sides and still have the implements conveniently at hand.

Further objects of the invention are to provide a device of the present character that is attractive in appearance, that holds the implement in position for quick and convenient use, and that is simple in construction.

Other objects and advantages of the invention will be brought out in the following part of the specification.

Referring to the drawings, which are for illustrative purposes only,

Fig. 1 is a plan view of a rack embodying the present invention;

Fig. 2 is a side view as seen from line 2—2 of Fig. 1, with a portion broken away;

Fig. 3 is a sectional view taken on line 3—3 of Fig. 2; and

Fig. 4 is a side view of the device shown installed on a meat cutting block.

Referring more particularly to the drawings, the device comprises a relatively flat, elongated, hollow body, indicated generally at 10, supporting a guide, indicated generally at 11, in which is received an implement holding member 12.

The body 10 is shown as formed of a single sheet metal, such as stainless steel or the like, forming a housing which is open at the back and at the bottom. This body includes a longitudinally extending front wall or skirt 13 having its lower edge backturned at 14 against the rear or inner side of said skirt to provide a smooth reinforced lower edge. There is also an inturned flange 15 along the upper edge of said skirt. At each end of the skirt 13 there is a portion which is turned rearwardly at substantially right angles to the skirt to form end walls 16 for said body 10 and from the inner or vertical rear edges of the walls 16 are parts 17 which are turned inwardly at approximately right angles to said walls 16 and constituting abbreviated rear walls. The lower edge portions of the walls 16 and parts 17 are provided with inwardly turned reinforcing flanges 18 and 19 respectively. The upper ends of said walls 16 and parts 17 are similarly flanged at 20 and 21.

The guide 11 is in the shape of an elongated U lying on its side on top of the body 10 and is formed of a channel strip which is generally U-shaped in cross section. The guide 11 includes side walls 22 and oppositely extending inturned flanges 23, along both the top and bottom edges of said walls 22, as best shown in Fig. 3. The end wall 24 of the guide is also provided with inturned flange 25 along the upper and lower edges and the flanges 23 and 25 are cut at an angle at their adjacent ends 26 to form a close fit as best shown in Fig. 1. The guide 11 is secured to the upper end of the body 10 by any suitable means. For example, the lower flange 23 of one of the arms of the U-shaped guide may be spot welded to the upper flange 15 of the skirt at longitudinally spaced points. The lower flange 23 of the other arm of the guide is spot welded adjacent its ends to the inturned upper flanges 20 of the part 17, and the lower inturned flange 25 of the wall 24 is spot welded to the adjacent upper flange 21 of one of the end walls 16 of the skirt. Thus, the guide is securely attached to the upper end of the skirt.

The implement holding member 12 comprises an elongated member 28 of rubber-like material, such as "neoprene" or a composition of "neoprene," which does not bleed and which will be substantially unaffected by grease. The member 28 is slidably or telescopically received in the guide 11 and may be inserted or removed from the end of the guide opposite the wall 24, said end being open. The member 28 is provided with a plurality of vertical openings therethrough for reception of blades, or the like, of implements used in cutting meat, it being understood that the oppositely turned flanges 23 have their inner edges sufficiently spaced apart so that implements may be inserted and removed from the openings in said member 28. There is one opening, indicated at 30, which is of sufficient length to receive the blade of a meat cleaver. Other openings, 31, are elongated for reception of the blades of knives 31a, and there are a pair of round openings 32, for reception of the blade of sharpening instruments or steel.

The end of the member 28, adjacent the open end of the guide, is provided with an opening therethrough for reception of a pin or screw 33 having a head 34 which rests on the upper surface of said member 28. The pin 33 extends below the lower surface of the member 28 and is received in a notch 35 in the adjacent flange 21 of the adjacent wall 16 of the skirt, thus preventing the member 28 from sliding outwardly of the guide 11. The pin 33, however, is removable and when removed the member 28 may be removed longitudinally from the guide, as indicated in dotted lines in Fig. 2.

On the outer side of the skirt there are a pair of hook-like hangers 36 adjacent the ends of said skirt, said hangers being spot welded as at 37 to said skirt. The hangers 36 provide means for removably supporting a saw 39, as best shown in Fig. 4. It is to be noted that the hangers 36 are at different levels although, if desired, they may be otherwise arranged. By hanging the saw 39, as shown in Fig. 4, the handle 40 thereof is disposed adjacent one end of the rack and may be readily grasped for removal and use, and may be as readily replaced.

Means for attaching the rack to the side of a meat cutting block 41 is also provided. This means includes a pair of inverted keyhole slots, indicated generally at 42, in the backturned parts or abbreviated rear walls 17, adjacent the upper ends thereof. A pair of double headed nails 43 are driven into the block in properly spaced relationship with respect to the keyhole slots 42, said nails being driven into the block to a point whereat the inner heads 45 abut against the outer surface of said block side. Each nail includes an outwardly extending stem 46 terminating in a head 47 which is thus spaced from the head 45. In mounting the rack the enlarged portions 48 of the keyhole slots 42 are slipped onto the heads 47, and the device is supported by the end walls of the reduced portions 49 of said slots which engage the stems 46. The heads 47 of the nails are of sufficient size with respect to the reduced portions 49 of the keyhole slots as to hold the rack on said nails. Thus, when the device is attached to the block, the skirt 13 is spaced from the adjacent side of the block, and the body 10 provides a protective covering for the blades of knives and other implements in the slots 31 and 32.

If desired, nails 43 may also be provided on the other side of the block so that the rack may be hung on said sides as desired. The rack may be thus rotated from one side to another so that the operator may use different parts of the block top and still have the knives and other implements readily at hand. With this arrangement the different parts of the block top may be used so as to prevent undue wear of any one part.

The skirt 13 of the rack protects the blades of the knives placed in said rack so that a person working at the meat block will not be accidentally cut by said blades, and the implement holding member 12 is of such material that the cutting edges of knife blades and the like, inserted into the slots thereof, will not be nicked or dulled by engagement of the walls of said slots.

Due to the fact that the rack may be readily removed from the block and the implement holding member 12 removed from its guide, the various parts of the device may be thoroughly cleaned.

I claim:

1. In a device of the class described, comprising: a relatively flat, elongated, hollow body formed of sheet metal and including a front wall; guide means extending along the top of the body and secured thereto; and an implement supporting member removably received in said guide, said member having longitudinally spaced openings therein.

2. The invention defined by claim 1, including hook-like hangers secured to the front wall, said hangers being spaced apart and adapted to support a saw.

3. In a device of the class described, comprising: a relatively flat, elongated, hollow body formed of sheet metal, said body including a front wall, end walls, and abbreviated rear walls extending toward each other from said end walls; an elongated U shaped guide of sheet metal extending along the upper side of said body and attached thereto, said guide being closed at one end and open at the other; and an implement supporting member slidably received in said guide, said member being of rubber and having longitudinally spaced openings therein for reception of implements.

4. The invention defined by claim 3 wherein the implement supporting member is provided with an opening adjacent the end thereof; and a pin received in said opening and extending into the body for engagement with a part thereof to retain said implement supporting member in the guide.

5. The invention defined by claim 3 wherein there are hook-like hangers secured to the front wall of the body for supporting a saw.

6. The invention defined by claim 3 wherein the abbreviated rear walls are provided with inverted keyhole openings for reception of headed members secured in the support whereby the device may be removably attached to said support.

WILLIAM L. WAGNER.

REFERENCES CITED

The following references are of record in the file of this patent:

UNITED STATES PATENTS

| Number | Name | Date |
|---|---|---|
| 1,323,915 | Schmitt | Dec. 2, 1919 |
| 1,876,284 | Fried | Sept. 6, 1932 |
| 1,894,258 | Eastlack | Jan. 17, 1933 |
| 2,122,069 | Michelson | June 28, 1938 |
| 2,190,567 | Jung | Feb. 13, 1940 |